Oct. 13, 1953

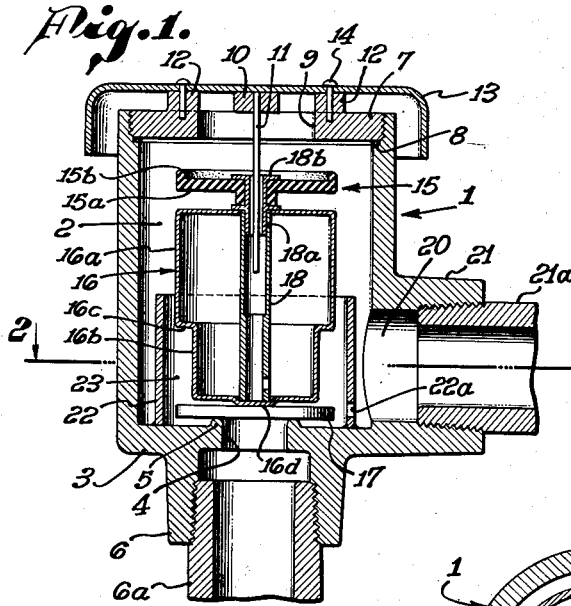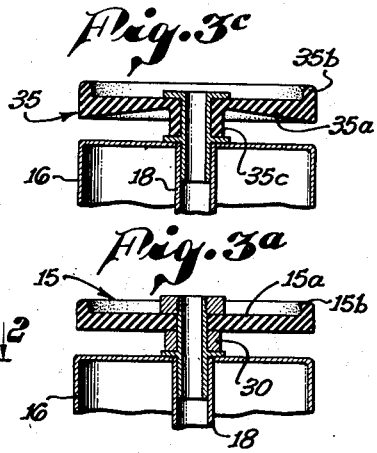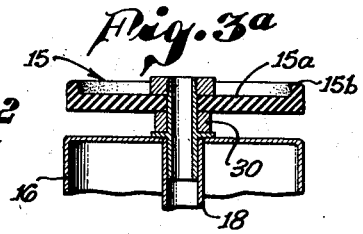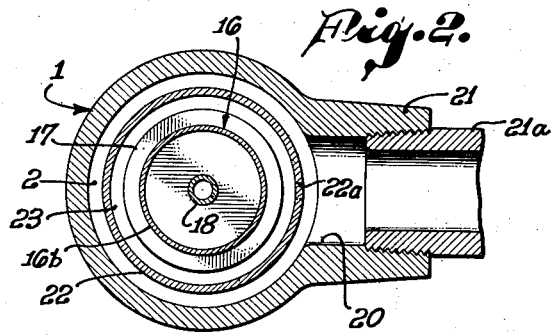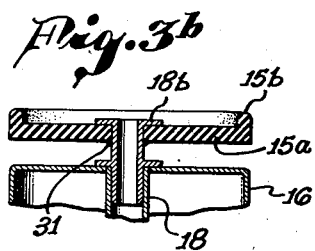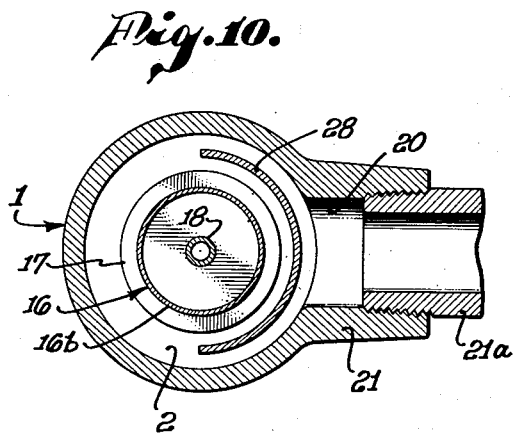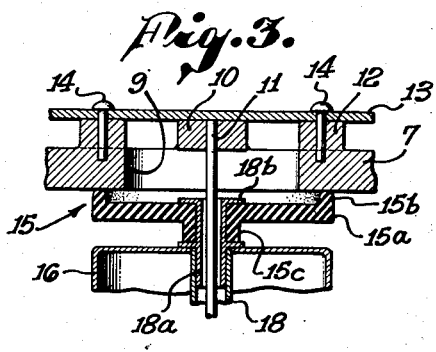

J. J. CANTOR 2,655,171

VACUUM BREAKER

Filed Aug. 29, 1947

INVENTOR.
BY *Jacob J. Cantor*
*Paul A. Weilein*
ATTORNEY

Patented Oct. 13, 1953

2,655,171

UNITED STATES PATENT OFFICE 2,655,171

VACUUM BREAKER

Jacob J. Cantor, Los Angeles, Calif.

Application August 29, 1947, Serial No. 771,172

4 Claims. (Cl. 137—218)

This invention relates to valve structures, commonly known as vacuum breakers, adapted for installation in water or other liquid supply systems to prevent siphoning of the liquid from a point of use back into the system, in response to the creation of a vacuum therein.

It is an object of this invention to provide an improved valve structure of this type.

Such valve structures usually include a liquid inlet valve, a liquid outlet, and an atmospheric inlet valve. As long as the liquid supply is maintained, the liquid inlet valve is open and the atmospheric valve is closed. If the liquid supply fails, the liquid inlet valve closes to prevent reverse flow through the inlet, and the atmospheric valve opens to admit air to the outlet and break the suction therein created by the backward movement of the liquid in the system.

It is another object of this invention to provide an improved form of atmospheric valve for vacuum breakers.

It is another object of this invention to provide an improved valve closure wherein misalignment between the closure and its seat does not impair the effectiveness of the seal.

It is another object of this invention to provide an improved float for operating the air and water inlet closures in a vacuum breaker.

It is another object of this invention to provide a vacuum breaker having improved means for guiding the float.

It is another object of this invention to provide a vacuum breaker wherein the float is so arranged that solids or foreign matter carried by the liquid will not render the float inoperative.

It is another object of this invention to provide a vacuum breaker wherein operation of the device to relieve a vacuum will not render the atmospheric valve inoperative to close.

It is another object of this invention to provide a vacuum breaker having an improved atmospheric valve, so arranged that a small quantity of liquid flowing through the vacuum breaker serves to close the valve.

It is another object of this invention to provide a vacuum breaker wherein the atmospheric valve will not be held open by the suction effect of the outlet when more liquid is leaving the vacuum breaker than is entering.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense since the scope of the invention is best defined by the appended claims.

In the drawings:

Figure 1 is an axial section of a vacuum breaker incorporating features of the invention;

Figure 2 is a cross section, taken substantially as indicated by line 2—2 of Figure 1;

Figure 3 is a fragmentary axial section on an enlarged scale showing the atmospheric valve closure in closed position;

Figure 11:
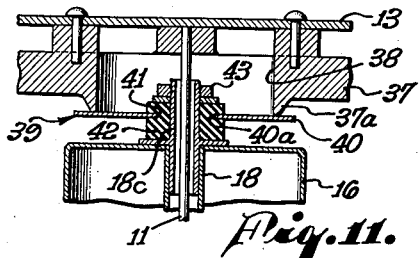
Figure 4:
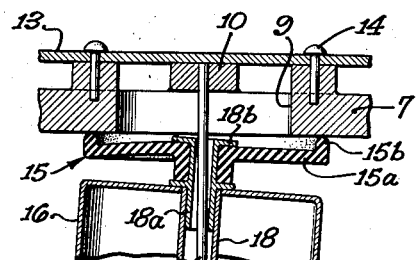
Figure 5:
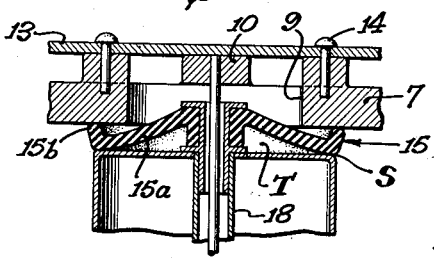
Figure 6:
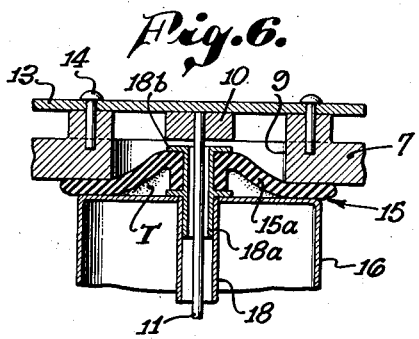
Figure 7:
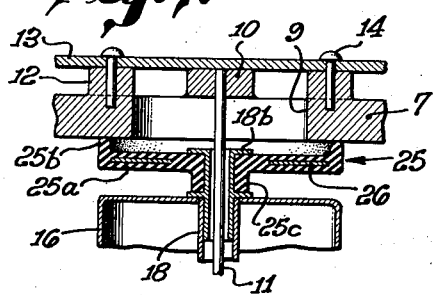
Figure 8:
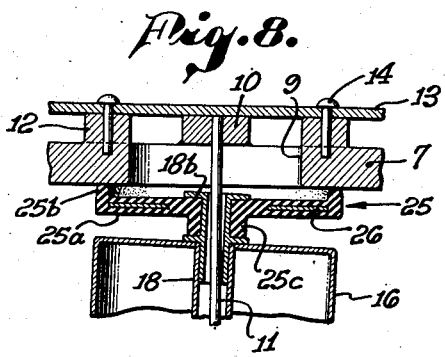
Figure 9:
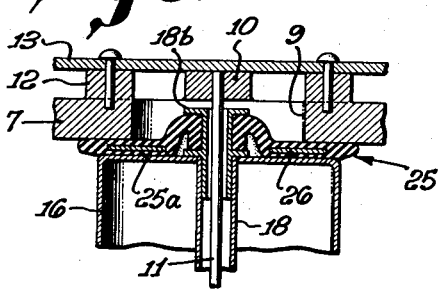

Figures 3-a, 3-b and 3-c are axial sections showing modified forms of atmospheric valve closures;

Figures 4, 5 and 6 are views similar to Figure 3, showing other operating positions of the valve closure;

Figure 7 is a view similar to Figure 3, but showing another modified form of valve closure;

Figures 8 and 9 are views similar to Figure 7, showing other operating positions of the closure;

Figure 10 is a cross section similar to Figure 2, but showing a modified form of vacuum breaker; and Figure 11 is a view similar to Figure 3, but showing a further modified form of atmospheric valve closure.

Referring to Figures 1 and 2, the vacuum breaker comprises a cylindrical body 1 having a vertical axis and forming a chamber 2. The lower end of the body 1 is closed by an integral head 3 having a liquid inlet port 4 therethrough, coaxial with the body 1 and surrounded by an annular valve seat 5. An interiorly threaded, external boss 6 is provided on the head 3 for connection with a liquid supply pipe 6-a.

The upper end of the body 1 is closed by a head 7 threaded into the body 1 against a shoulder 8 provided with a suitable gasket. The head 7 has a central opening 9 coaxial with the body 1, forming the air inlet, and spanned by a diametral bar 10 which supports a depending axially disposed guide pin or rod 11. A pair of bosses 12 at the edge of opening 9 on opposite sides of the bar 10 serve to mount a cap 13 secured as by drive pins 14. The cap 13 protects the air inlet 9 against direct entry of undesirable solids, dust and the like, at the same time freely admitting air.

A closure 15 of novel form is provided for the air inlet 9 and comprises a resilient saucer-like body or disc 15-a, of rubber for example, with an upstanding peripheral flange or rib 15-b adapted to seat and seal against the bottom surface of the head 7 about the opening 9. The closure 15 is mounted on top of a float member 16 and in spaced relation thereabove. In this way, the body 15-a is adapted for limited universal movement with respect to the supporting float 16, as will be more fully pointed out hereinafter.

The closure for the inlet port 4 comprises a light disc 17 of metal or the like, which is urged against the seat 5 by gravity.

The float 16 is interposed between the closures 15 and 17, and has upper and lower cylindrical portions 16-a and 16-b of different diameters, the upper portion 16-a being of larger diameter and joined to the lower portion 16-b by a downwardly facing annular shoulder 16-c. A float of this type when substantially submerged has greater buoyancy at its upper end, and accordingly tends to remain upright and to move in a vertical direction, thus simplifying the problem of providing a suitable guide. The opposite ends of the float 16 are closed appropriately, an axial tube 18 extending upwardly from the bottom of the float and through the top wall, serving to mount the closure 15, and having an upper end portion of reduced inside diameter as indicated at 18-a, which slidingly engages the guide pin 11. This reduced portion 18-a provides sufficient clearance about the pin 11 to insure free movement of the float 16 in response to changes in the liquid level, as well as to permit limited misalignment between the float 16 with respect to the pin 11 and the seating surface on the head 7. However, the length and diameter of the bore 18-a is so proportioned with respect to the diameter and length of the pin 11 as to restrict such misalignment so that the end of the pin 11 can at no time engage the interior surface of the tube 18 and possibly restrict or prevent movement of the float 16.

The bottom of the float 16 has a circular extension 16-d of such diameter as to provide a seat for the lower end of the tube 18 and which serves to support the float 16 on the closure 17 when there is no liquid in chamber 2 to support the float.

As shown in Figure 3, the tube 18 extends above the top of the float 16 for mounting the closure 15. Thus the closure body 15-a may be provided with an integral hub 15-c on its lower side, the tube 18 passing through an opening in the hub and the body, and having a flange 18-b at its upper end for confining the hub 15-c against the top of the float 16. The hub 15-c serves as a spacer to maintain the body 15-a spaced above the float.

It is not necessary to provide an integral hub as 15-c to maintain the closure body 15-a spaced above the float 16. Thus as shown in Fig. 3-a, a spacer 30 may be provided which is in the form of a ring. This ring may be of metal or other suitable material and may be merely confined between the closure body 15-a and the top of the float 16, or may be secured to the float. In Figure 3-b, the body 15-a is shown as secured at an appropriate distance above the float 16 as by being vulcanized to the tube 18, as indicated at 31.

The body 1 has a side outlet 20 adjacent its lower end, an internally threaded boss 21 being provided for connecting a suitable pipe or conduit 21-a with the outlet 20.

A cylindrical wall or baffle 22 is secured to the bottom head 3 about the inlet 4 within the chamber 2, extending across the outlet 20, and forming a well 23 for accommodating the float 16. A small drain port 22-a is provided in the wall 22, near its lower end.

In operation, liquid enters at 4, raises the valve closure 17, flows into well 23, and raises float 16, together with flexible closure 15, the float 16 being guided by guide rod 11. Valve 15 occludes atmospheric opening 9. The major portion of the water spills over rim of wall 22 and leaves the vacuum breaker through outlet 20.

Referring to Figure 1, it will be noted that the pin 11 is effective only to guide the upper end of the float 16. The lower end of the float is steadied and directed by the force of the water confined and directed upwardly by the wall 22.

Upon cessation of the liquid flow through the inlet 4, the closure 17 will seat and substantially all liquid above the level of the wall 22 will pass directly out through the outlet 20. Liquid in the well 23 will pass out through the aperture 22-a. This prevents any lateral force acting upon the bottom of the float 16 and tending to draw the float towards this opening 20. The importance of this action is apparent when the flow of liquid into the vacuum breaker is intermittent.

Under conditions of intermittent flow, especially when liquid is flowing from the outlet 20 at a rate greater than that at which it is entering through the inlet 4, the baffle or wall 22 prevents the float 16 from being drawn towards the outlet 20 and held by the suction effect of the outgoing liquid. Under such conditions, if the wall 22 were not present, the buoyancy of the float 16 would not be sufficient to overcome the force of the suction holding the float 16 against the outlet 20. Thus the atmospheric valve would be held open. A surge of incoming liquid under such conditions would rise above the float 16 and flow out through the atmospheric opening 9.

The opening 22-a acts as a drain for removing any liquid remaining in the well 23 after liquid ceases to enter the inlet 4. Since the opening 22-a is always below the level of the bottom of the float 16 and is of restricted size, the liquid discharging through it can exert little lateral force on the float 16. The float 16 is therefore free from the suction produced at the outlet 20 and is always freely buoyant.

If desired, a baffle of limited extent may be provided across the outlet 20 for preventing the lateral movement of the float 16 due to the suction at the outlet 20. For example, referring to Figure 10, an arcuate wall 28 of substantially 180 degrees extent is shown in lieu of the cylindrical wall 22 of Figures 1 and 2. Otherwise the structure of Figure 10 is substantially identical with that of the first described form of the invention.

The shape of the float is such that the force of the confined liquid in the well 23 impinges on the bottom and shoulder 16-c of float 16. As the float rises, the area available for the passage of liquid is materially increased.

As previously pointed out, the tube 18 in the float 16 is a loose fit on the guide pin 11, so that the float 16 may be substantially misaligned with respect to the air inlet 9, a particular feature of the closure 15 being that it will effectively seal the inlet 9, regardless of such misalignment, and will permit variations in the angular relationship between the closure and the float, due to the liquid flow in chamber 2.

A difficulty sometimes encountered in prior art vacuum breakers, is the failure of the valve at the atmospheric opening to remain closed during low variable water pressures. This is due to the eddying currents, acting upon the float 16 and pulling a portion of the valve margins 15-b off its seat, with the result that liquid can pass through this opening and escape through the atmospheric opening 9.

Besides directing the liquid directly upward by means of the wall or baffle 22, the float member 16 is so designed that its greatest buoyancy is at its upper end, causing it to be less affected by the minor eddying currents present in the liquid in the chamber 2. Any eddy currents not taken care of by the wall 22 and the particular shape of the float 16, are taken care of by the novel relation between the float 16 and the valve member 15. Thus, the closure 15 being spaced away for the top of the float 16 will remain in contact with its seat on the head 7, even though the float 16 may move through a considerable angle with respect to the seat. This is due to the flexibility of the central portion of the closure body 15-a.

Figure 3 shows the closure 15 seated in response to relatively light upward pressure by the float 16, the float being substantially aligned with the inlet 9. The narrow peripheral rib 15-b cooperates with the inner surface of the head 7 to seal about the inlet 9. However, the resilience of the closure 15 is such as to maintain an effective seal under conditions of substantial misalignment, such for example as shown in Fig. 4. Thus the need for accurately guiding the float 16 is avoided.

In response to increased upward pressure on the float 16, the central portion of the closure 15 will be forced upwardly so that in addition to the seal provided by the peripheral rib 15-b, a second seal is provided at "S," between the lower edge of the closure 15 and the top of the float 16, as shown in Figure 5.

If sufficient upward force acts on the float 16, the peripheral rib 15-b will be flexed outwardly and the outer portion of the closure 15 will be confined between the top of the float and the under face of the head 9, as shown in Figure 6.

It will be apparent from an inspection of Figure 5, that the seals at "S" and about the tube 18 cooperate to form an annular sealed space "T," in which air and liquid is trapped. As the float 16 moves upwardly to the position of Figure 6, the volume of this space T is substantially reduced so that the air therein is compressed. Thus when the upward force on float 16 is released, this trapped air urges the float downwardly, insuring quick opening of the port 9.

It may be desirable to provide an atmospheric inlet closure which is less yieldable than the closure 15 just described, but which will still accommodate misalignment as well as angular movement of the float 16. Such a closure 25 is shown in Figure 7 and comprises a body 25-a which may be formed of material similar to that in the previous form and having a peripheral flange 25-b and means to maintain the body spaced above the float 16 such as an integral hub 25-c, all as before. In this case, however, a flat ring 26 of stiff material is moulded in the body 25-a, the central resilient portion of the body 25-a within the opening of the ring 26, and the hub 25-c sufficing to allow limited universal movement between the closure 25 and the float 16, to permit seating of the closure, as shown in Figure 8, or to form a double seal as shown in Figure 9.

As in the first described form of atmospheric inlet closure, the body 25-a may be maintained spaced above the float by a separate spacer ring, or by being secured to the tube 18.

In Figure 3-c, a valve closure 35 is shown which is quite similar to the first described form of closure 15, having a resilient body 35-a of rubber or the like, with a peripheral upstanding rib 35-b and a central integral hub 35-c. However in this form of closure, the body 35-a is of reduced thickness immediately about the hub 35-c, so that a central annular portion is provided which is substantially weaker or less resistant to flexing than the outer portions of the body. This facilitates the accommodation by the closure 35 while in closed position of any misalignment between the float 16 and valve seat on the head 7, as well as the simultaneous sealing against the seat and against the float 16 in a manner similar to that shown in Figure 5.

In Figure 11, a form of atmospheric valve is shown which is especially suitable for use with hot liquids. A modified form of head 37 is used which is identical with the head 7 except for the provision of an annular depending rib 37-a forming a seat above the opening 38. The closure member 39 comprises a thin disc 40 of light gauge sheet metal or a suitable plastic, having a central aperture 40-a for accommodating a reduced portion or neck 41 of a hub 42. This hub 42 is mounted on an extension 18-c of the tube 18, which is threaded to receive a nut 43 securing the hub 42 in place on the float 16.

The hub 42 is formed of an appropriate material such as a plastic or rubber compound, which is sufficiently resilient to allow universal movement and/or misalignment between the seat 37-a and the float 16, while the closure 39 is maintained seated by the float, in a manner similar to that discussed hereinbefore.

A closure arranged in the above described manner enables the use of certain materials having important advantages, such as high seat tolerance, which are not well adapted for forming the previously described types of closures.

I claim:

1. In a vacuum breaker, means forming a chamber having air and liquid inlets at its upper and lower end respectively, as well as an outlet adjacent said lower end, a closure for each of said inlets, the closure for said liquid inlet operating automatically to prevent reverse liquid flow, a float disposed in said chamber for vertical movement to operate the air inlet closure, and means restricting flow from said chamber through said outlet to cause operating movement of said float in response to a small flow of liquid through said liquid inlet.

2. In a vacuum breaker, means forming a chamber having air and liquid inlets at its upper and lower end respectively, as well as an outlet adjacent said lower end, a closure for each of said inlets, the closure for said liquid inlet operating automatically to prevent reverse liquid flow, a float disposed in said chamber for vertical movement to operate the air inlet closure, means forming a well to receive the liquid from said liquid inlet, and accommodating said float, to cause operating movement of said float in response to a small flow of liquid through said liquid inlet, and means for draining said well upon cessation of liquid flow.

3. In a vacuum breaker, means forming a chamber having an air inlet in its upper end, a liquid inlet in its lower end, and a side outlet adjacent its lower end, a closure for each of said inlets, the closure for the liquid inlet operating automatically to prevent reverse flow, means forming a vertically extending well about said water inlet, a float disposed in said well for vertical movement to operate the air inlet closure in response to changes in the liquid level in the well, the wall of said well serving to restrict lateral movement of the float; and means for draining the well.

4. In a vacuum breaker, means forming a chamber having an air inlet in its upper end, a liquid inlet in its lower end, and a side outlet adjacent its lower end, a closure for each of said inlets, the closure for the liquid inlet operating automatically to prevent reverse flow, a vertical wall extending about said liquid inlet and forming a well, a float for operating the air inlet closure, disposed in said chamber and said well for vertical movement, and having an enlarged upper portion extending into said well, and providing a downwardly directed shoulder, liquid from said inlet entering said well and flowing over said wall to the outlet, said enlarged float portion co-operating with said wall to provide a constricted annular opening for liquid flow from said well, movement of said float to inlet closing position causing said enlarged portion to be spaced above the well providing an enlarged opening for said water flow.

JACOB J. CANTOR.

References Cited in the file of this patent
UNITED STATES PATENTS

| Number | Name | Date |
|---|---|---|
| 257,853 | Dibble | May 16, 1882 |
| 603,592 | Buckingham | May 3, 1898 |
| 839,855 | Jones | Jan. 1, 1907 |
| 920,556 | Fitts | May 4, 1909 |
| 1,424,756 | Dean | Aug. 8, 1922 |
| 1,452,999 | Brier | Apr. 24, 1923 |
| 1,506,012 | Lewis | Aug. 26, 1924 |
| 2,103,057 | Blumer | Dec. 21, 1937 |
| 2,116,592 | Bassett | May 10, 1938 |
| 2,252,164 | Cantor | Aug. 12, 1941 |
| 2,313,773 | Samiran | Mar. 16, 1943 |
| 2,325,956 | Holtman | Aug. 3, 1943 |
| 2,332,695 | Cantor | Oct. 26, 1943 |